United States Patent
Moon et al.

(10) Patent No.: US 11,852,840 B2
(45) Date of Patent: Dec. 26, 2023

(54) DISPLAY DEVICE EMPLOYING META SURFACE

(71) Applicant: SAMSUNG ELECTRONICS CO., LTD., Suwon-si (KR)

(72) Inventors: Seokil Moon, Suwon-si (KR); Sangeun Mun, Seoul (KR); Sunil Kim, Seoul (KR); Wontaek Seo, Yongin-si (KR); Geeyoung Sung, Daegu (KR); Bongsu Shin, Seoul (KR); Daeho Yang, Suwon-si (KR); Hongseok Lee, Seoul (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 17/241,774

(22) Filed: Apr. 27, 2021

(65) Prior Publication Data

US 2022/0171209 A1  Jun. 2, 2022

(30) Foreign Application Priority Data

Dec. 2, 2020  (KR) .................. 10-2020-0166940

(51) Int. Cl.
*G02B 27/28* (2006.01)
*G02B 27/01* (2006.01)
(Continued)

(52) U.S. Cl.
CPC ....... *G02B 27/286* (2013.01); *G02B 27/0093* (2013.01); *G02B 27/0172* (2013.01);
(Continued)

(58) Field of Classification Search
CPC .............. G02B 27/286; G02B 27/0093; G02B 27/0172; G02B 26/0816;
(Continued)

(56) References Cited

U.S. PATENT DOCUMENTS 6,542,272 B1 * 4/2003 Watanabe ............ H04B 10/532
  398/152
9,817,233 B2 * 11/2017 Nakagawa ........... G02B 3/0043
(Continued)

FOREIGN PATENT DOCUMENTS

CA    2 976 903 A1    8/2016
JP      6449236 B2    1/2019

OTHER PUBLICATIONS

Jang et al., "Holographic Near-eye Display with Expanded Eyebox," ACM Transactions on Graphics, vol. 37, No. 6, Article 195, Nov. 2018, Total 14 pages.
(Continued)

*Primary Examiner* — Bryan Earles
(74) *Attorney, Agent, or Firm* — Sughrue Mion, PLLC

(57) ABSTRACT

A display device including a meta surface is provided. The display device includes an image provider comprising a spatial light modulator configured to modulate light according to image information, wherein the image provider is configured to provide the light comprising the image information; an optical element configured to focus the light from the image provider; and a meta surface deflector positioned between the image provider and the optical element to deflect the light, and change a deflection direction of the light according to a polarization of the light so that a first position of the light of a first polarization focused by the optical element is different than a second position of the light of a second polarization orthogonal to the first polarization focused by the optical element.

20 Claims, 15 Drawing Sheets

(51) Int. Cl.
*G02B 27/00* (2006.01)
*G02B 26/08* (2006.01)

(52) U.S. Cl.
CPC .. *G02B 26/0816* (2013.01); *G02B 2027/0174* (2013.01); *G02B 2027/0178* (2013.01)

(58) Field of Classification Search
CPC .... G02B 2027/0174; G02B 2027/0178; G02B 1/002; G02B 27/0081; G02B 27/0101; G02B 27/283; G02B 5/32; G02B 7/1821; G02B 27/28; G02B 2027/0187; G02B 2207/101
See application file for complete search history.

(56) References Cited

U.S. PATENT DOCUMENTS

| | | | |
|---|---|---|---|
| 9,897,811 B2 | 2/2018 | Martinez et al. | |
| 10,254,547 B2 | 4/2019 | Tremblay et al. | |
| 10,725,304 B1 | 7/2020 | Ratnam et al. | |
| 11,175,507 B2* | 11/2021 | Jamali | G02B 26/0808 |
| 2012/0188467 A1* | 7/2012 | Escuti | G02F 1/1347 349/1 |
| 2016/0077261 A1* | 3/2016 | Arbabi | G02B 5/021 359/493.01 |
| 2017/0068091 A1* | 3/2017 | Greenberg | G02B 27/104 |
| 2018/0120559 A1* | 5/2018 | Yeoh | G02B 5/1842 |
| 2018/0156949 A1* | 6/2018 | Tsai | G03H 1/0244 |
| 2019/0075281 A1* | 3/2019 | Hall | G01S 7/4814 |
| 2020/0064633 A1 | 2/2020 | Maimone | |
| 2020/0348418 A1* | 11/2020 | Sutton | G01S 7/4817 |
| 2022/0026721 A1* | 1/2022 | Jamali | G02B 5/1828 |
| 2022/0107500 A1* | 4/2022 | Khorasaninejad | H04N 13/211 |

OTHER PUBLICATIONS

Maimone et al., "Holographic Near-Eye Displays for Virtual and Augmented Reality," ACM Transactions on Graphics, vol. 36, No. 4, Article 85, Jul. 2017, Total 16 pages.

* cited by examiner

DISPLAY DEVICE EMPLOYING META SURFACE

CROSS-REFERENCE TO RELATED APPLICATION(S)

This application is based on and claims priority under 35 U.S.C. § 119 to Korean Patent Application No. 10-2020-0166940, filed on Dec. 2, 2020, in the Korean Intellectual Property Office, the disclosure of which is incorporated by reference herein in its entirety.

BACKGROUND

1. Field

The present disclosure relates to a display device employing a meta surface.

2. Description of Related Art

Virtual reality (VR) is a technology that enables humans to experience real life in a virtual world created by a computer. Augmented reality (AR) is a technology that allows virtual images to be mixed with a physical environment or space of the real world.

Displays that provide VR have reached the commercialization stage and are widely used in the entertainment industry. In addition, displays have been developed for applications in the medical, education, and industrial fields. AR displays, which are advanced forms of VR displays, are image devices that combine the real world with VR and may lead to an interaction between reality and VR. The interaction between reality and VR is based on a function of providing real-time information related to a real situation, and may further increase the effect of reality by overlapping virtual objects or information on the environment of the real world. An AR display includes a combiner for combining a virtual image with an external real foreground and providing the combined image to an observer.

Recently, research into a glasses-type display device that provides AR, that is, AR glasses, has been actively conducted, and research using angular selectivity, wavelength selectivity, and thin volume characteristics of a holographic optical element (HOE) or a diffractive optical element (DOE) in the combiner of an AR device has been conducted.

The combiner using the HOE directly focuses an image on a viewer's eyes such that the viewer may see the image. At this time, because light emitted from an image providing device is diffracted by the combiner and then converges to one point, an eyebox, which is a region where the user may fully observe the virtual image, is restricted to one point. Accordingly, it is possible to observe an image only when the user's eyes are accurately positioned at a point where the light converges, and when the eye rotates or the AR glasses with the AR display shake even a little from the face, the image becomes invisible. As described above, when the eyebox is greatly restricted, a correction process of adjusting a point where the image is visible in accordance with an eye gap of the user after wearing the glasses is necessary, which makes it very cumbersome for users with various eye gaps to share and use one pair of AR glasses.

SUMMARY

Provided is a display device using a meta surface for expanding an eyebox.

Additional aspects will be set forth in part in the description which follows and, in part, will be apparent from the description, or may be learned by practice of the presented embodiments of the disclosure.

According to an aspect of the disclosure, a display device may include an image provider comprising a spatial light modulator configured to modulate light according to image information, wherein the image provider is configured to provide the light comprising the image information; an optical element configured to focus the light from the image provider; and a meta surface deflector positioned between the image provider and the optical element to deflect the light, and change a deflection direction of the light according to a polarization of the light so that a first position of the light of a first polarization focused by the optical element is different than a second position of the light of a second polarization orthogonal to the first polarization focused by the optical element.

The image provider may include a polarization rotator configured to convert the polarization of the light directed to the meta surface deflector.

The first polarization and the second polarization may be linear polarizations or circular polarizations orthogonal to each other, and the polarization rotator may be configured to convert the polarization of the light from the first polarization to the second polarization or from the second polarization to the first polarization.

The polarization rotator may be configured to be driven in synchronization with the spatial light modulator.

The display device may include a steerer configured to steer the light deflected by the meta surface deflector to move a position at which an image is focused by the optical element.

The steerer may be configured to drive the meta surface deflector to move the position at which the image is focused.

The display device may include a mirror member provided between the image provider and the meta surface deflector, and the steerer may be configured to drive the mirror member to change an angle at which the light is incident on the meta surface deflector, and move the position at which the image is focused.

The display device may include an eye tracker configured to sense a position of an observer's eye, and the steerer may be configured to move the position at which the image is focused by the optical element according to the position of the observer's eye sensed by the eye tracker.

The optical element may be configured to reflect the light from the image provider and transmit external light.

The optical element may include at least one of a hologram optical element and a diffractive optical element.

The first polarization and the second polarization may be linear polarizations orthogonal to each other, and the meta surface deflector may include a two-dimensional arrangement of nanostructures having lengths or widths that are variable in a first direction and a second direction orthogonal to the first direction.

The meta surface deflector may include a plurality of first nanorods having lengths that are variable in the first direction and arranged at a first period to deflect the light of the first polarization, a plurality of second nanorods having lengths variable in the second direction and arranged at a second period to deflect the light of the second polarization, and an array of the plurality of first nanorods and an array of the plurality of second nanorods may be alternately arranged to form a two-dimensional array of nanorods, or the plurality of first nanorods and the plurality of second nanorods overlap each other to form a two-dimensional array of cross-shaped nanorod structures.

The meta surface deflector may include an arrangement of quadrangular nanostructures or elliptical anisotropic nanostructures in which widths in the first direction and widths in the second direction are variable.

The first polarization and the second polarization may be circular polarizations orthogonal to each other, and the meta surface deflector may include a two-dimensional arrangement of nanostructures in which an angle inclined with respect to the first direction is variable.

The meta surface deflector may include a plurality of first nanorods having angles inclined with respect to the first direction that are variable in a first rotation direction and arranged at a first period to deflect the light of the first polarization, a plurality of second nanorods having angles inclined with respect to the second direction that are variable in a second rotation direction orthogonal to the first rotation direction and arranged at a second period to deflect the light of the second polarization, and an array of the plurality of first nanorods and an array of the plurality of second nanorods may be alternately arranged to form a two-dimensional arrangement of nanorods.

The meta surface deflector may include a nanostructure including split ring resonator patterns, and a two-dimensional array of the split ring resonator patterns is arranged such that positions of split portions of the split ring resonator patterns are variable.

The display device may be a wearable device.

The display device may be an augmented reality (AR) display device of a head mounted type, glasses type, goggle type, or a head-up type.

The display device may be of a glasses type, and the optical element may be a glass lens or provided on the glass lens.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
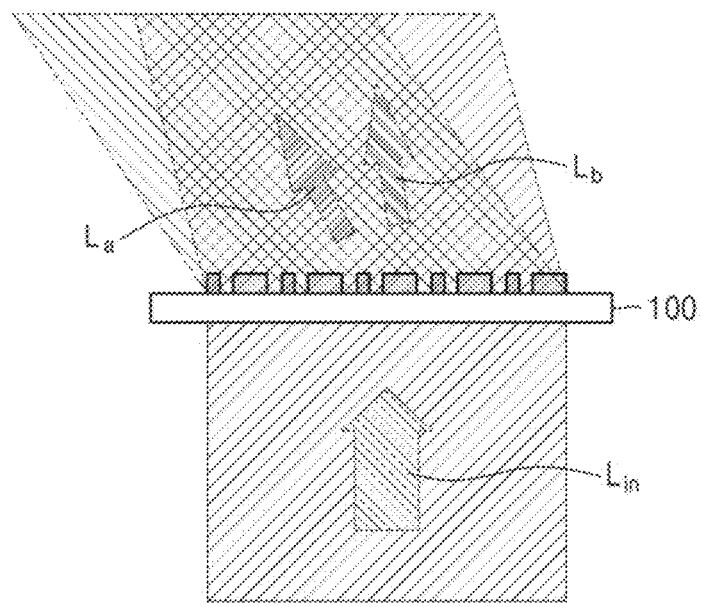
FIG. 1 schematically illustrates a structure of a meta surface deflector applied to a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. In the drawings, the same reference numerals represent the same elements, and a size of each element may be exaggerated for clarity and convenience of description. Embodiments described below are merely examples and various modifications may be made therein.

As used herein, the term "on" or "above" an element may be understood to mean that the element may be directly on another element such that the element and the other element are in direct contact, or may be on another element provided between the element and the other element such that the element and the other element are not in direct contact with the other element. Although the terms "first," "second," etc., may be used herein to describe various elements, these terms are only used to distinguish one element from another. These terms do not limit difference of materials or structures of elements. As used herein, the singular expressions of terms are intended to include plural forms of the terms as well, unless the context clearly dictates otherwise. It will be understood that when an element is referred to as "including" another element, the element may further include other elements unless mentioned otherwise. The term "the" and demonstratives similar thereto may be understood to include both singular and plural forms.

A display device according to an embodiment includes a polarization-dependent meta surface deflector. The meta surface deflector changes a traveling direction, that is, a deflection direction, of transmitted light according to a polarization state of incident light through an appropriate periodic arrangement of nanostructures.

The display device according to the embodiment may be implemented as a head mounted type, glasses type, goggles type, or head-up type AR device, and in this case, an anisotropic meta surface deflector may be arranged in an end of the combiner such as, for example, a hologram device where light modulated according to image information from an image provider is incident such that the combiner may focus on a different position according to a polarization of the incident light. Accordingly, according to the polarization of the incident light, for example, images of two frames may be imaged on different positions such that an eyebox may be formed to be at least twice the size as compared to the case where a meta surface deflector, as described herein, is not applied. In addition, when a steering device that is deflected by the meta surface deflector to steer light entering the combiner is coupled and a steering angle is adjusted to project an image appropriately to an eye position detected by an eye tracker, the eyebox expanding at least twice the size may move along an observer's view and provide the image with respect to a sufficiently large region.

To this end, the anisotropic meta surface deflector may be formed in an arrangement that spatially multiplexes a periodic structure that folds light according to polarization on a meta surface. In addition, the anisotropic meta surface deflector may be designed to have a nanostructure of a unit structure in a complex shape such as a cross-shaped nanorod or a split ring resonator structure such that the nanostructure of the unit structure reacts differently to two polarizations orthogonal to each other, thereby increasing a fill factor and improving efficiency. In addition, the anisotropic meta deflector may be designed to have a nanostructure as a dielectric antenna with different lengths of a major axis and a minor axis such that one unit structure antenna may differentiate a phase delay of light transmitted according to the polarization, and thus incident light may be deflected according to the polarization.

FIG. 1 schematically illustrates a structure of a meta surface deflector 100 applied to a display device according to an embodiment.

Referring to FIG. 1, the meta surface deflector 100 may be disposed between an image provider and an optical element such as, for example, a combiner, in the display device according to an embodiment.

The meta surface deflector 100 may be provided to change a deflection direction according to a polarization of incident light Lin. That is, the meta surface deflector 100 may be provided to deflect the incident light Lin at different angles according to the polarization. In FIG. 1, reference numeral La denotes light having a first polarization deflected at a first deflection angle, and reference numeral Lb denotes light having a second polarization deflected at a second deflection angle. In this case, for example, one of the first polarization and the second polarization may be a first linear polarization such as, for example, a horizontal polarization, and the other may be a second linear polarization such as, for example, a vertical polarization. As another example, one of the first polarization and the second polarization may be a first circular polarization such as, for example, a left circular polarization, and the other may be a second circular polarization such as, for example, a right circular polarization.

As described above, the meta surface deflector 100 may be formed as an anisotropic meta surface deflector so as to bend at different deflection angles according to the polarization of incident light Lin.

For example, the meta surface deflector 100 may employ anisotropic meta surface deflectors 110, 120, 150, and 160 having a two-dimensional arrangement of nanostructures in which lengths or widths are variable in first and second directions which are orthogonal to each other, such as shown in FIGS. 2 and 3, 6A and 6B, and 7A and 7B, respectively, to deflect light of the first polarization and the second polarization which are linear polarizations orthogonal to each other at different angles.

Figure 4:
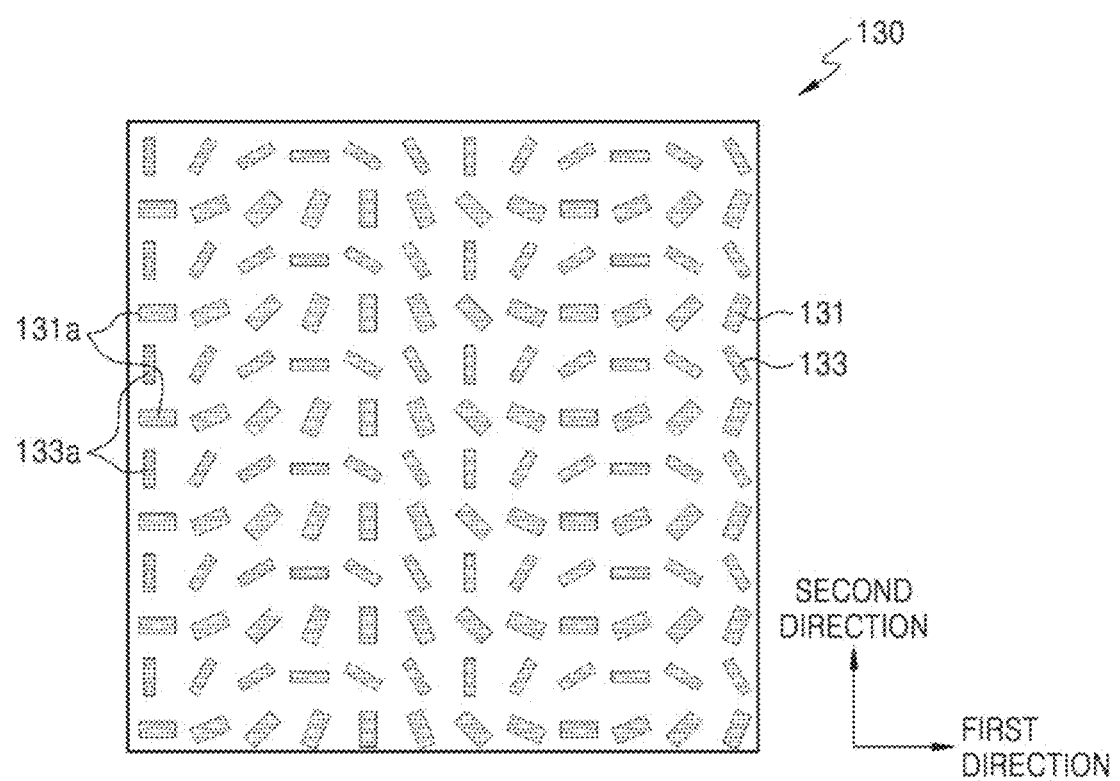
FIGS. 4 and 5 illustrate structures of anisotropic meta surface deflectors having a two-dimensional arrangement of nanostructures in which an angle with respect to a first direction such as, for example, a horizontal direction, is variable so as to deflect incident light at different angles according to a circular polarization.
Figure 5:
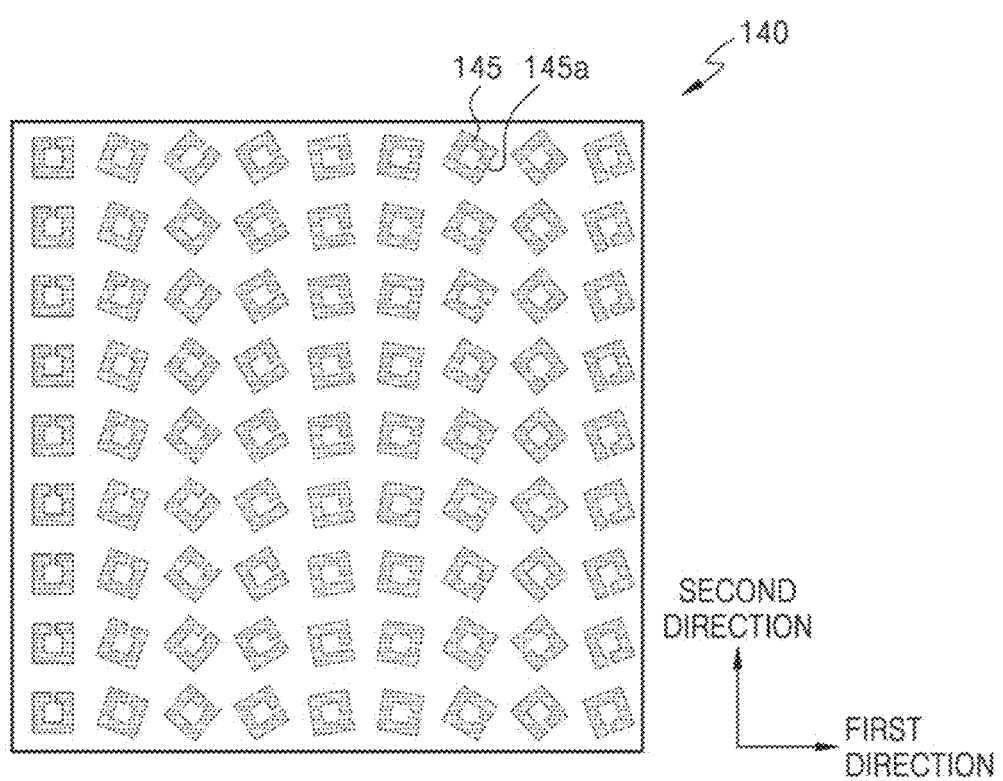

In addition, for example, the meta surface deflector 100 may employ anisotropic meta surface deflectors 130 and 140 having the two-dimensional arrangement of nanostructures in which angles inclined with respect to the first direction such as, for example, a horizontal direction, are variable, as shown in FIGS. 4 and 5 to deflect light of the first polarization and the second polarization which are circular polarizations orthogonal to each other at different angles.

Figure 2:
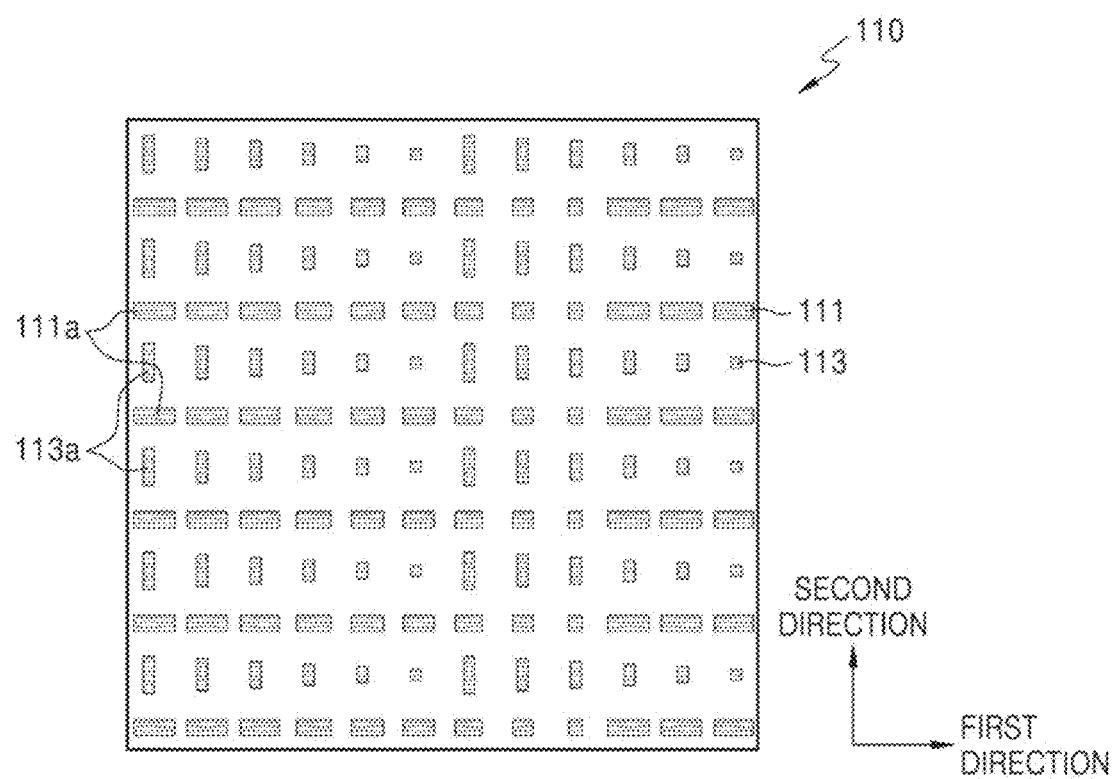
FIGS. 2 and 3 illustrate structures of anisotropic meta surface deflectors capable of deflecting incident light at different angles according to a linear polarization.
Figure 3:
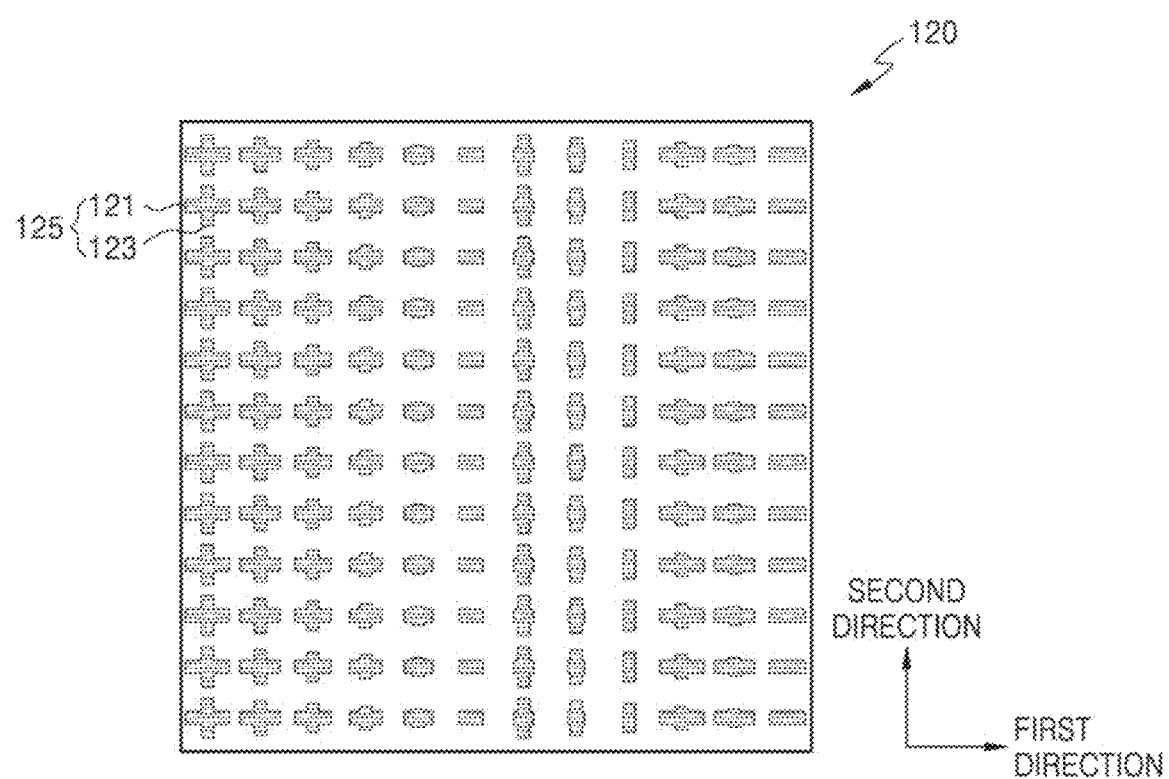

FIGS. 2 and 3 respectively illustrate structures of the anisotropic meta surface deflectors 110 and 120 capable of deflecting incident light at different angles according to a linear polarization.

Referring to FIG. 2, the anisotropic meta surface deflector 110 may be provided to include a plurality of first nanorods 111 and a plurality of second nanorods 113 to form a two-dimensional array of nanorods in which an array 111a of the first nanorods 111 and an array 113a of the second nanorods 113 are alternately arranged. The plurality of first nanorods 111 may have lengths that are variable in a first direction such as, for example, a horizontal direction, and may be arranged at a certain period, so as to deflect light of a first linear polarization. The plurality of second nanorods 113 may have lengths that are variable in a second direction such as, for example, a vertical direction, and may be arranged at a certain period or a different period, so as to deflect light of a second linear polarization.

Referring to FIG. 3, the anisotropic meta surface deflector 120 may be provided to include a plurality of first nanorods 121 and a plurality of second nanorods 123 to form a two-dimensional array of structures of cross-shaped nanorods 125 in which the first nanorods 121 and the second nanorods 123 overlap each other. The plurality of first nanorods 121 may have lengths that are variable in the first direction such as, for example, the horizontal direction, and may be arranged at a certain period, so as to deflect the light of the first linear polarization. The plurality of second nanorods 123 may have lengths that are variable in the second direction such as, for example, the vertical direction, and may arranged at a different period, so as to deflect the light of the second linear polarization.

By the anisotropic meta surface deflectors 110 and 120 of FIGS. 2 and 3, incident light having the first linear polarization such as, for example, a horizontal polarization and incident light having the second linear polarization such as, for example, a vertical polarization may be bent in different directions and deflected in different directions.

FIGS. 4 and 5 illustrate structures of the anisotropic meta surface deflectors 130 and 140 having a two-dimensional arrangement of nanostructures in which an angle that is inclined with respect to a first direction such as, for example, a horizontal direction, is variable so as to deflect incident light at different angles according to a circular polarization.

Referring to FIG. 4, the anisotropic meta surface deflector 130 may be provided to include a plurality of first nanorods 131 and a plurality of second nanorods 133 to form a two-dimensional arrangement of nanorods in which an array 131a of the first nanorods 131 and an array 133a of the second nanorods 133 may be alternately arranged. The plurality of first nanorods 131, in which an angle inclined with respect to a first direction such as, for example, a horizontal direction, is variable in a first rotation direction, may be arranged at a certain period so as to deflect light of a first circular polarization. The plurality of second nanorods 133, in which an angle inclined with respect to a second direction such as, for example, a vertical direction, is variable in a second rotation direction orthogonal to the first rotation direction, may be arranged at a certain period or a different period so as to deflect light of a second circular polarization.

Referring to FIG. 5, the anisotropic meta surface deflector 140 may be provided to include a nanostructure of split ring resonator patterns 145 and to form a two-dimensional array of the split ring resonator patterns 145 arranged such that positions of split portions 145a of the split ring resonator patterns 145 are variable.

As shown in FIG. 5, when the nanostructure, that is, a structure of a nano antenna may be designed in a complex form such as the split ring resonator pattern 145, and when an angle of rotation is adjusted, the anisotropic meta surface deflector 140 in which an bent angle is different according to right and left circular polarizations may be designed.

By the anisotropic meta surface deflectors 130 and 140 of FIGS. 4 and 5, incident light having the first circular polarization and incident light having the second circular polarization orthogonal thereto may be bent in different directions and thus deflected in different directions.

As shown in FIGS. 2 and 4, so as to bend light having two orthogonal polarizations at different angles, the anisotropic meta surface deflectors 110 and 130 that change a deflection direction of light according to the polarization in a simple structure may be designed by spatially multiplexing a period structure that bends light of each polarization. These anisotropic meta surface deflectors 110 and 130 may consider only a resonance characteristic in a direction parallel to a target polarization of a nanorod type antenna, and thus an intuitive design is possible.

In addition, as shown in FIGS. 3 and 5, when the antenna of a unit structure is designed in a complex form so as to react differently to two polarizations orthogonal to each other, the efficient anisotropic meta surface deflectors 120 and 140 may be implemented by increasing a fill factor to a high level.

Figure 6A:
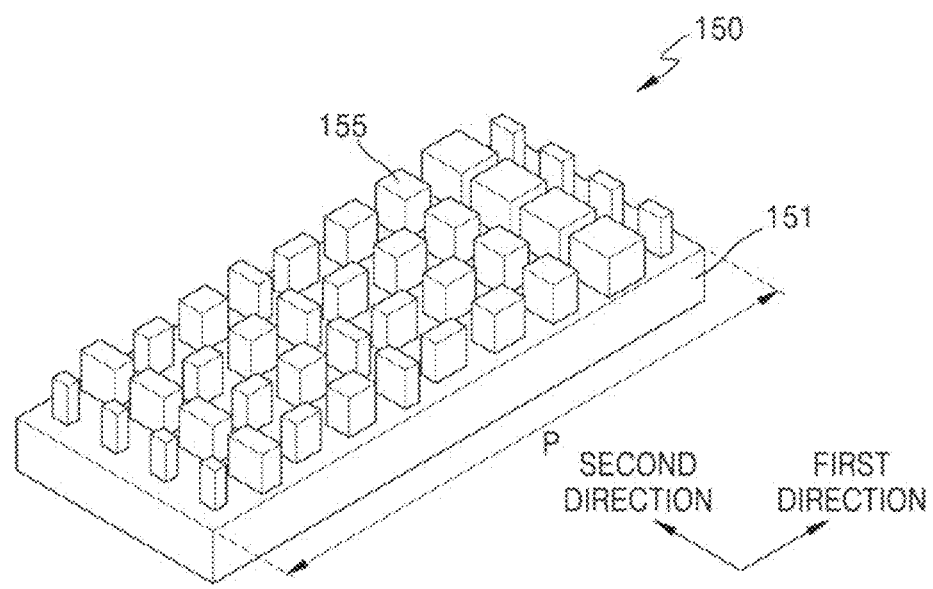
FIGS. 6A and 6B illustrate a structure of an anisotropic meta surface deflector capable of deflecting incident light at different angles according to a linear polarization.
Figure 6B:
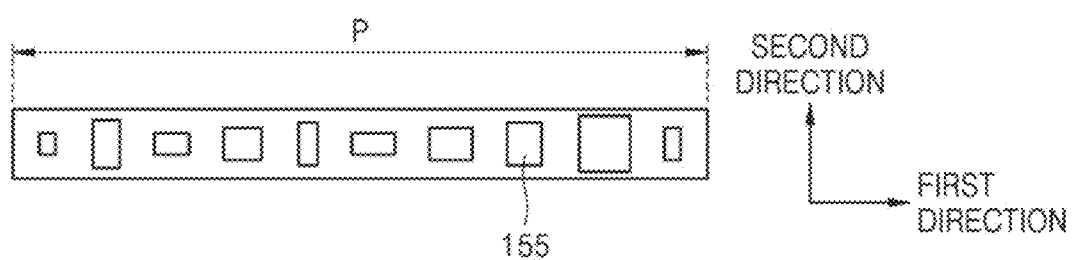

FIGS. 6A and 6B illustrate a structure of the anisotropic meta surface deflector 150 capable of deflecting incident light at different angles according to a linear polarization.

Referring to FIGS. 6A and 6B, the anisotropic meta surface deflector 150 may include an arrangement of quadrangular anisotropic nanostructures 155 in which widths in a first direction and widths in a second direction orthogonal thereto are variable.

Figure 7A:
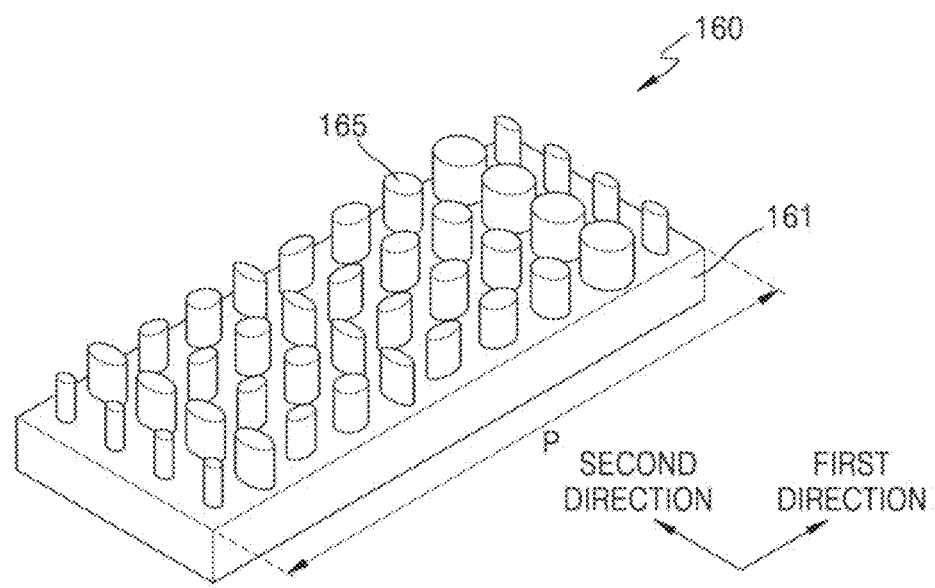
FIGS. 7A and 7B illustrate a structure of an anisotropic meta surface deflector capable of deflecting incident light at different angles according to a linear polarization.
Figure 7B:
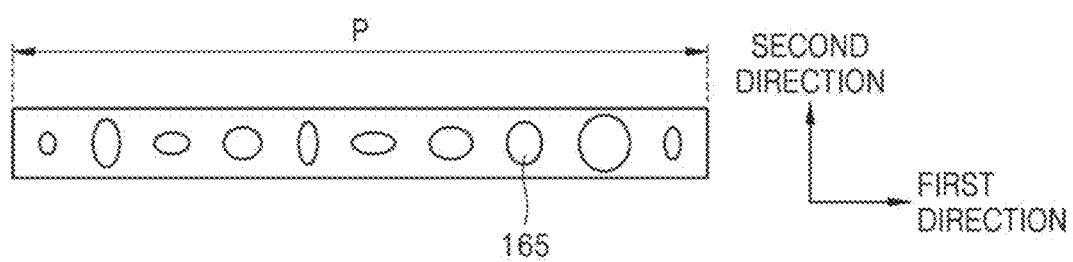

FIGS. 7A and 7B illustrate a structure of the anisotropic meta surface deflector 160 capable of deflecting incident light at different angles according to a linear polarization.

Referring to FIGS. 7A and 7B, the anisotropic meta surface deflector 160 may include an arrangement of elliptical anisotropic nanostructures 165 in which widths in a first direction and widths in a second direction orthogonal thereto are variable.

FIGS. 6A and 6B and FIGS. 7A and 7B respectively illustrate the anisotropic nanostructures 155 and 165 in a rectangular shape and an elliptical shape, but these are examples, and the anisotropic nanostructures 155 and 165 may be formed in a more complex shape.

The arrangements of the anisotropic nanostructures 155 and 165 of the anisotropic meta surface deflectors 150 and 160 described with reference to FIGS. 6A and 6B and FIGS. 7A and 7B are arrangements of dielectric nano antennas designed with different lengths of a major axis and a minor axis in a period structure P, and the lengths of the major axis and the minor axis may be selected differently such that a phase delay of light transmitted according to the polarization may be different, and thus a direction of deflection of the light may change according to the polarization of incident light.

In these anisotropic meta surface deflectors 150 and 160, the anisotropic nanostructures 155 and 165, that is, nano antennas, may be formed in the rectangular shape, the elliptical shape, or a complex shape using a material of a high refractive index dielectric such as a-Si, p-Si, $TiO_2$, $TiSiO_2$, etc. Substrates 151 and 161 of a bottom end of the nano antennas configuring the anisotropic meta surface deflectors 150 and 160 may include a transparent material such as, for example, $SiO_2$, glass, quartz, etc. These anisotropic meta surface deflectors 150 and 160 may increase a bandwidth of an operating wavelength by controlling a dispersion characteristic, and increase a fill factor, thereby increasing a light efficiency.

When the various anisotropic meta surface deflectors 110, 120, 130, 140, 150, and 160 described with reference to FIGS. 2, 3, 4, 5, 6A and 6B, and 7A and 7B are employed as the meta surface deflector 100 of a display device according to the embodiment, light deflected at different angles according to polarization may be focused on a different position by an optical element such as, for example, a combiner. Accordingly, according to the polarization of the incident light, for example, images of two frames may be imaged on different positions such that an eyebox may be formed at least twice the size as compared to the case where the meta surface deflector 100 is not applied. In addition, when a steering device to steer light that is deflected by the meta surface deflector 100 and then entering the combiner is coupled and a steering angle is adjusted to project an image appropriately to a pupil position detected by an eye tracker, the eyebox expanding at least twice the size may move along an observer's view and thus the image may be provided with respect to a sufficiently large region.

Figure 8:
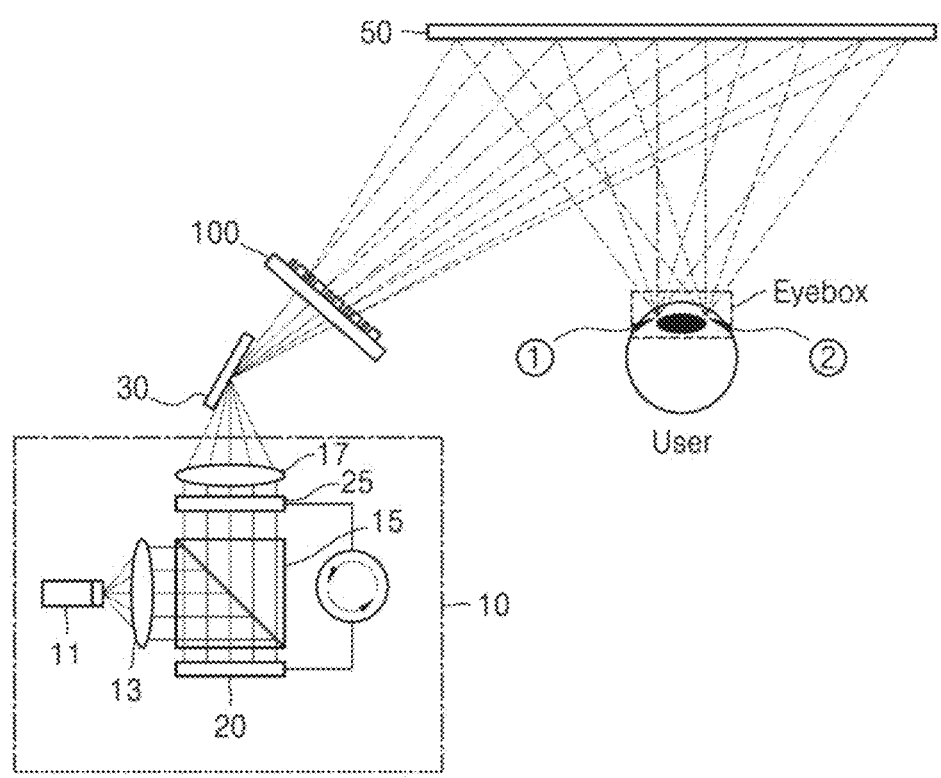
FIG. 8 schematically illustrates a configuration of a display device using a meta surface according to an embodiment.

FIG. 8 schematically illustrates a configuration of a display device using a meta surface according to an embodiment.

The display devices of FIG. 8 and various embodiments below include the meta surface deflector 100 described with reference to FIG. 1. In addition, the display devices of FIG. 8 and various embodiments below may include the anisotropic meta surface deflectors 110, 120, 130, 140, 150, and 160 described with reference to FIGS. 2, 3, 4, 5, 6A and 6B, and 7A and 7B as the meta surface deflector 100.

Referring to FIG. 8, the display device according to an embodiment includes an image provider 10 providing light including image information, an optical element 50 focusing light including the image information provided from the image provider 10, and a meta surface deflector 100 positioned between the image provider 10 and the optical element 50 to deflect incident light according to a polarization. In addition, the display device according to the embodiment may further include a mirror member 30 between the image provider 10 and the meta surface deflector 100.

The image provider 10 includes a spatial light modulator 20 that modulates light according to the image information to form an image. The image provider 10 may further include a polarization rotator 25 converting the polarization of the light including the image information generated by the spatial light modulator 20.

The spatial light modulator 20 may modulate the light according to the image information about the image to be provided to an observer to form the image. The spatial light modulator 20 may be, for example, the reflective spatial light modulator. The spatial light modulator 20 may include, for example, a liquid crystal on silicon (LCoS) panel, a liquid crystal display (LCD) panel, a digital light projection (DLP) panel, or a digital micromirror device (DMD) panel. In addition, the spatial light modulator 20 may include a display panel such as an organic light emitting diode (OLED), a micro LED, and a quantum dot (QD) LED.

The polarization rotator 25 may be driven in synchronization with the spatial light modulator 20. The polarization rotator 25 may be synchronized with the spatial light modulator 20 to modulate light directed to the meta surface deflector 100 into light of a first polarization or a second polarization orthogonal thereto. In this case, the first polarization and the second polarization may be linear polarizations or circular polarizations orthogonal to each other.

For example, when the meta surface deflector 100 is provided to deflect light according to the linear polarization of incident light, the polarization rotator 25 may be provided to modulate light traveling to the meta surface deflector 100 into the first linear polarization or the second linear polarization orthogonal thereto.

As another example, when the meta surface deflector 100 is provided to change a deflection direction according to the circular polarization of incident light, the polarization rotator 25 may be provided to modulate the light traveling to the meta surface deflector 100 into a first circular polarization or a second circular polarization orthogonal thereto. Here, one of the first linear polarization and the second linear polarization may be a horizontal polarization, and the other may be a vertical polarization. In addition, one of the first circular polarization and the second circular polarization may be a left circular polarization, and the other may be a right circular polarization.

The polarization rotator 25 may be, for example, a liquid crystal polarization rotator. When the liquid crystal polarization rotator is provided as the polarization rotator 25, the polarization rotator 25 may be driven by controlling on/off of a driving voltage such that a polarization of light passing through the polarization rotator 25 has the first polarization or the second polarization orthogonal thereto. As another example, the polarization rotator 25 may be provided such that the light passing through the polarization rotator 25 maintains an original polarization state or has the first polarization or the second polarization orthogonal thereto.

As described above, when the polarization of light incident on the meta surface deflector 100 changes by driving the polarization rotator 25 in synchronization with the spatial light modulator 20, and when a deflection direction of the light changes according to the polarization, a position of light focused by the optical element 50 may change.

Therefore, for example, because images of two frames may be imaged on different positions according to the polarization of incident light, an eyebox may be formed to be at least twice the size as compared to the case where the meta surface deflector 100 is not applied.

As another example, the image provider 10, as a structure that does not include the polarization rotator 25, may be configured such that the light from the image provider 10 directed to the meta surface deflector 100 includes both first and second polarization components. Even in this case, because the meta surface deflector 100 deflects light of the first polarization component and light of the second polarization component in the incident light at different angles, an image of one frame may be imaged on two different positions. Compared to the case where the meta surface deflector 100 is not applied, the eyebox may expand, for example, at least twice the size as compared to the case where the meta surface deflector 100 is not applied. In FIG. 8 and the following other embodiments, the image provider 10 including the polarization rotator 25 is illustrated as an example, but this is only an example and the embodiment is not limited thereto.

The image provider 10 may further include a focusing lens 17 that focuses light (hereinafter referred to as "an image light") including the image information generated by the spatial light modulator 20. When the image provider 10 includes the focusing lens 17, the mirror member 30 may be disposed at or near a focal position of the focusing lens 17. Therefore, the image light including the image information generated by the spatial light modulator 20 may be focused by the focusing lens 17 and reflected by the mirror member 30 and then incident on the meta surface deflector 100.

The image provider 10 may further include a light source 11 that provides light, a collimating lens 13 for collimating the light emitted from the light source 11, and a light path conversion member 15 (e.g., a beam splitter) for changing the path of the collimated light. The image provider 10 may be configured such that light emitted from the light source 11 and collimated by the collimating lens 13, for example, is reflected by the light path conversion member 15 to be directed to the spatial light modulator 20, and light directed to the light path conversion member 15 from the spatial light modulator 20 may be transmitted through the light path conversion member 15. As another example, the image provider 10 may be configured such that light emitted from the light source 11 and collimated by the collimating lens 13 transmitting the light path conversion member 15 to be directed to the spatial light modulator 20 and light directed to the light path conversion member 15 from the spatial light modulator 20 is reflected by the light path conversion member 15. Here, the image provider 10 may not include the collimating lens 13 between the light source 11 and the light path conversion member 15.

The spatial light modulator 20 may be of a self-light emitting type. For example, the spatial light modulator 20 may include a display panel such as an organic light emitting diode (OLED), a micro LED, and a quantum dot (QD) LED as the self-light emitting type spatial light modulator. In this way, when the spatial light modulator 20 is configured as the self-light emitting type spatial light modulator, the light source 11, the collimating lens 13, and the light path conversion member 15 may be omitted. FIG. 8 and the following drawings illustrate that the image provider 10 includes the light source 11, the collimating lens 13, and the light path conversion member 15 as an example, but this is only an example and the embodiment is not limited thereto.

FIG. 8 and the following embodiments illustrate that one lens is provided as the focusing lens 17 as an example. The focusing lens 17 may include a plurality of lens units. In addition, FIG. 8 and the following embodiments illustrate that one collimating lens 13 is applied to collimate the light emitted from the light source 11 as an example. In order to collimate the light, the collimating lens 13 may include a plurality of lenses.

As described above, the image provider 10 includes the spatial light modulator 20 modulating the light according to the image information, and the remaining configurations may be modified in various ways. FIG. 8 and the following embodiments illustrate an example of the configuration of the image provider 10, but the embodiment is not limited thereto, and various modifications are possible as described above.

The optical element 50 is for focusing the light from the image provider 10 to form an image on the user's eyes, and the optical element 50 may be provided to reflect and focus the light incident from the image provider 10. In addition, the optical element 50 may be provided to transmit and focus external light.

According to the display according to the embodiment, the optical element 50 as a combiner may include, for example, any one of a holographic optical element and a diffractive optical element. Accordingly, in the display device according to the embodiment, light representing a VR image from the image provider 10 is reflected by the optical element 50, that is, a combiner, and transmitted to the user's eyes, and light representing a real world image passes through the optical element 50 and is transmitted to the user's eyes. Accordingly, an AR image in which the real world image and the VR image supplied from the image provider 10 overlap may be viewed by the user's eyes, whereby the display device according to the embodiment may be implemented as an AR display device. As another example, the optical element 50 may be provided to enable control to block the light representing the real world image, and selectively make only the VR image supplied from the image provider 10 visible to the user's eyes. In this case, the display device according to the embodiment may be selectively implemented as a display device for AR or a display device for VR.

According to the display device according to the embodiment described above, the eyebox may be formed to be twice as wide as compared to the case where the meta surface deflector 100 is not applied by adding the polarization rotator 25 synchronized with the spatial light modulator 20 and the meta surface deflector 100.

In addition, when a hologram element uses as the optical element 50, that is, a combiner, for example, in the case of the hologram element, a signal light may be reproduced even when light is incident at a slightly different angle from a reference light used in a recording process. The signal light described above may be reproduced at a slightly different angle from a signal light used in the recording process.

Accordingly, the display device according to the embodiment may be driven as follows. For example, in a first frame, the spatial light modulator 20 may reproduce an image to be observed at a position ① in FIG. 8. In this regard, the polarization rotator 25 synchronized with the spatial light modulator 20 may modulate the passing light into light of a first polarization such as, for example, a horizontal polarization. The light modulated into the horizontal polarization may be diffracted at a specific angle as passing through the meta surface deflector 100 and then reach the optical element 50 to converge to the position ①. Next, in a second frame, the spatial light modulator 20 may reproduce an image to be observed at a position ②, and the polarization rotator 25 may modulate the passing light into light of a second polarization such as, for example, a vertical polarization. The light modulated into the vertical polarization may be diffracted at an angle different from that of the horizontal polarization when passing through the meta surface deflector 100 and then converged to the position ② by the optical element 50. When the two frames are repeatedly reproduced quickly, the user receives both images at the same time, and when both images enter the pupil at the same time, monocular focus information is received according to a super multi-view condition. Furthermore, because the eyebox is formed twice as wide as compared to the case where the meta surface deflector 100 is not applied, it is easy to observe an image even when the eye rotates, and the convenience of wearing the device may greatly increase when other users use the device. All of these processes may be applied not only to linear polarizations orthogonal to each other, but also to circular polarizations orthogonal to each other, that is, right and left circular polarizations.

When the image provider 10 has a structure that does not include the polarization rotator 25, and the light from the image provider 10 directed to the meta surface deflector 100 is configured to include both the first polarization and the second polarization components, because the meta surface deflector 100 deflects the light of the first polarization component and the light of the second polarization component of incident light at different angles, an image of one frame may converge to two different positions, namely, the positions ① and ② at the same time. Therefore, even when the image provider 10 has the structure that does not include the polarization rotator 25, the eyebox may expand, for example, at least twice the size as compared to the case where the meta surface deflector 100 is not applied, and thus it is easy to observe the image even when the eye rotates, and when other users use the device, the convenience of wearing the device may greatly increase. In addition, this process may be applied not only to linear polarizations orthogonal to each other, but also to circular polarizations orthogonal to each other, that is, right and left circular polarizations.

Figure 9:
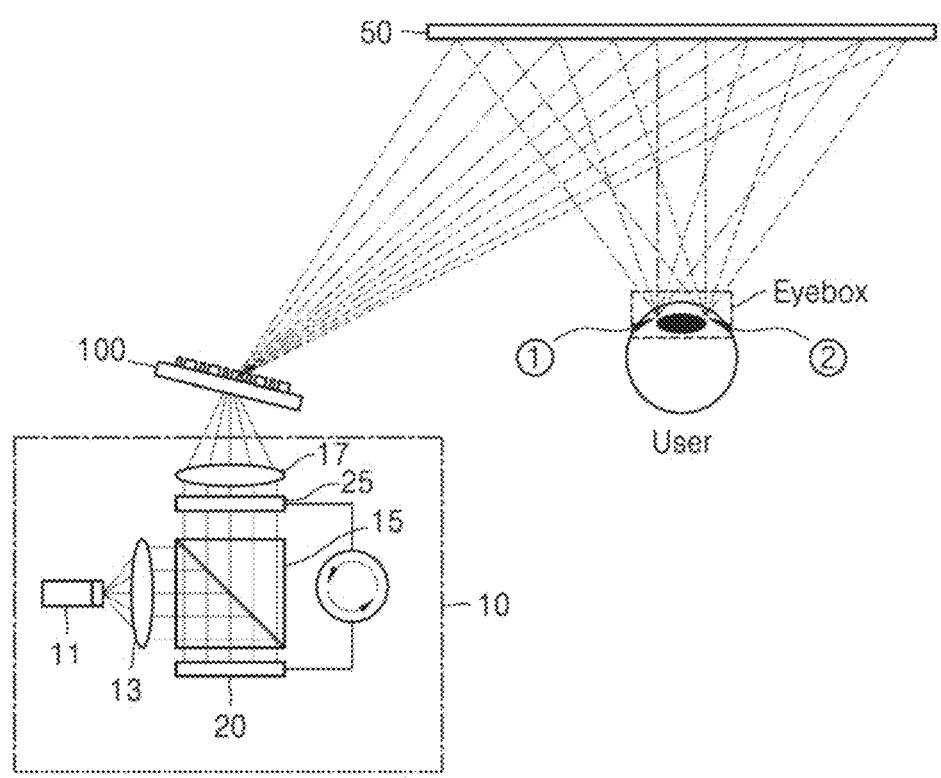
FIG. 9 schematically illustrates a configuration of a display device using a meta surface according to another embodiment.

FIG. 9 schematically illustrates a configuration of a display device using a meta surface according to another embodiment, and includes, as compared with FIG. 8, a structure in which the mirror member 30 between the image provider 10 and the meta surface deflector is excluded. Here, substantially the same components as in FIG. 8 are denoted by the same reference numerals, and repetitive descriptions are omitted. As shown in FIG. 9, when the mirror member 30 is excluded, the meta surface deflector 100 may be disposed at or near a focus of the focusing lens 17.

The display device of FIGS. 8 and 9 may further include an eye tracker 80 that senses a position of an observer's eye as in FIGS. 10A and 10B and FIGS. 11A and 11B described below. In FIGS. 8 and 9, the illustration of the eye tracker 80 is omitted.

As in FIGS. 10A and 10B and FIGS. 11A and 11B, the display device according to the embodiment may further include a steerer 70 steering light deflected by the meta surface deflector 100 to move a position at which an image is focused by the optical element 50 and the eye tracker 80 sensing the position of the observer's eye.

Figure 10A:
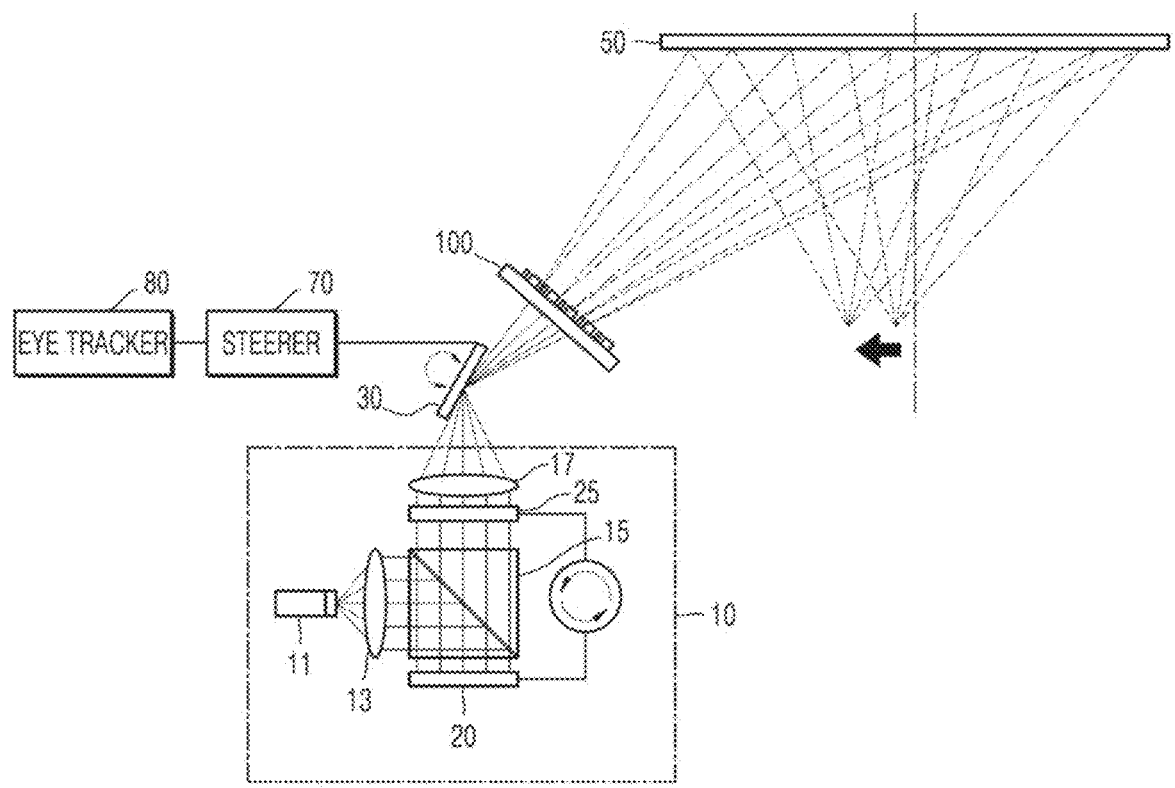
FIGS. 10A and 10B schematically illustrate a configuration of a display device using a meta surface according to another embodiment.
Figure 10B:
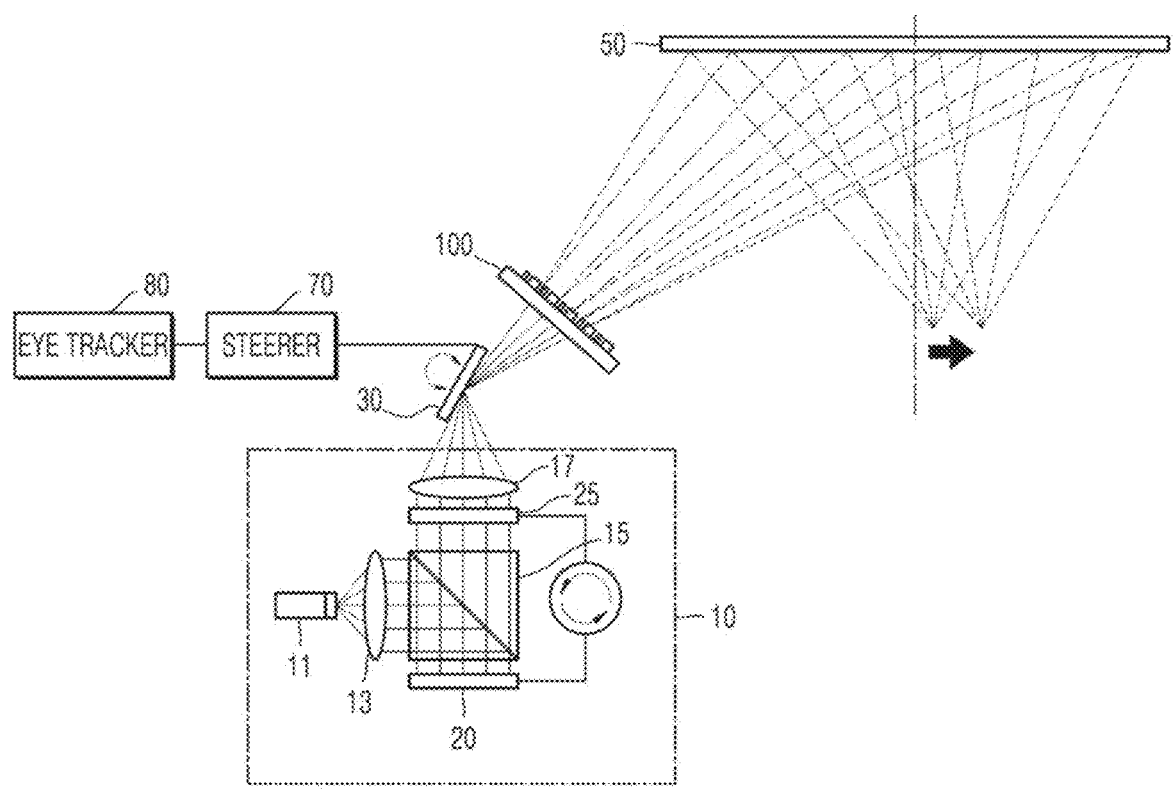

FIGS. 10A and 10B schematically illustrate a configuration of a display device using a meta surface according to another embodiment. Compared with FIG. 8, the display device may further include the steerer 70 and the eye tracker 80. The steerer 70 may drive the mirror member 30 so that an angle at which light is incident on the meta surface deflector 100 changes to move a position at which the image is focused.

Figure 11A:
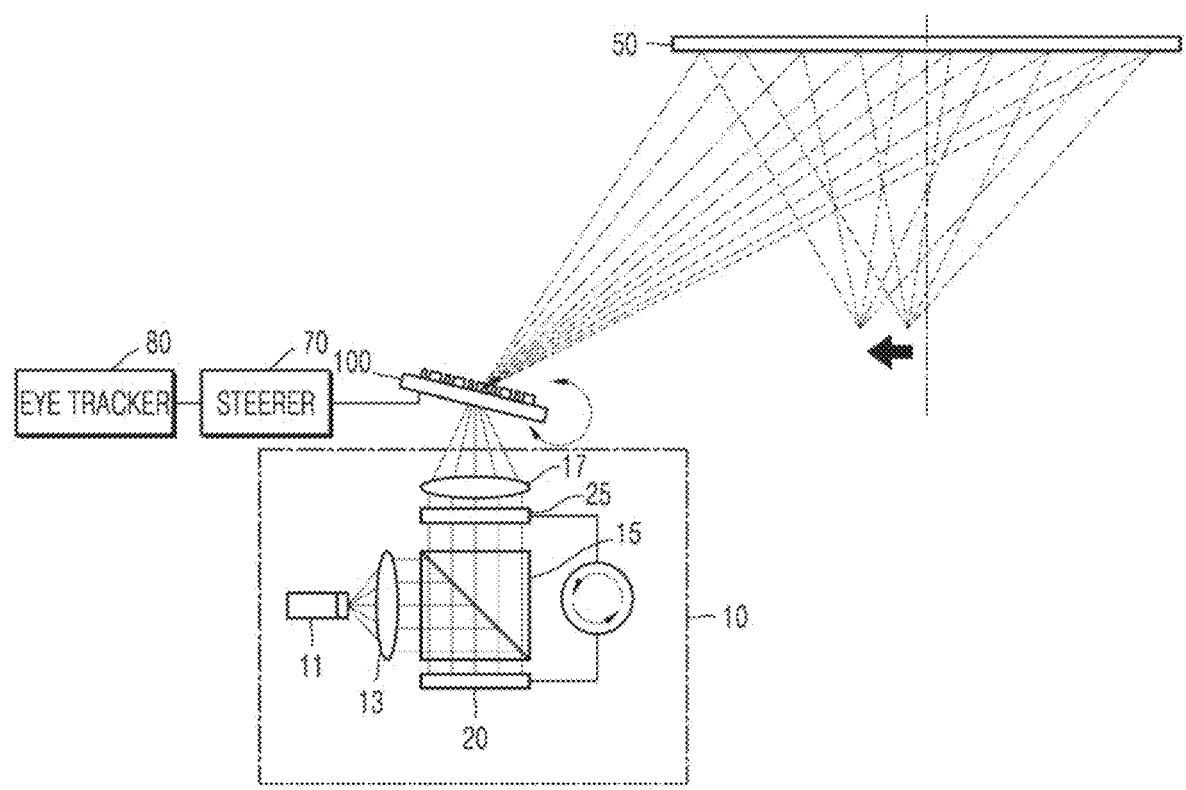
FIGS. 11A and 11B schematically illustrate a configuration of a display device using a meta surface according to another embodiment.
Figure 11B:
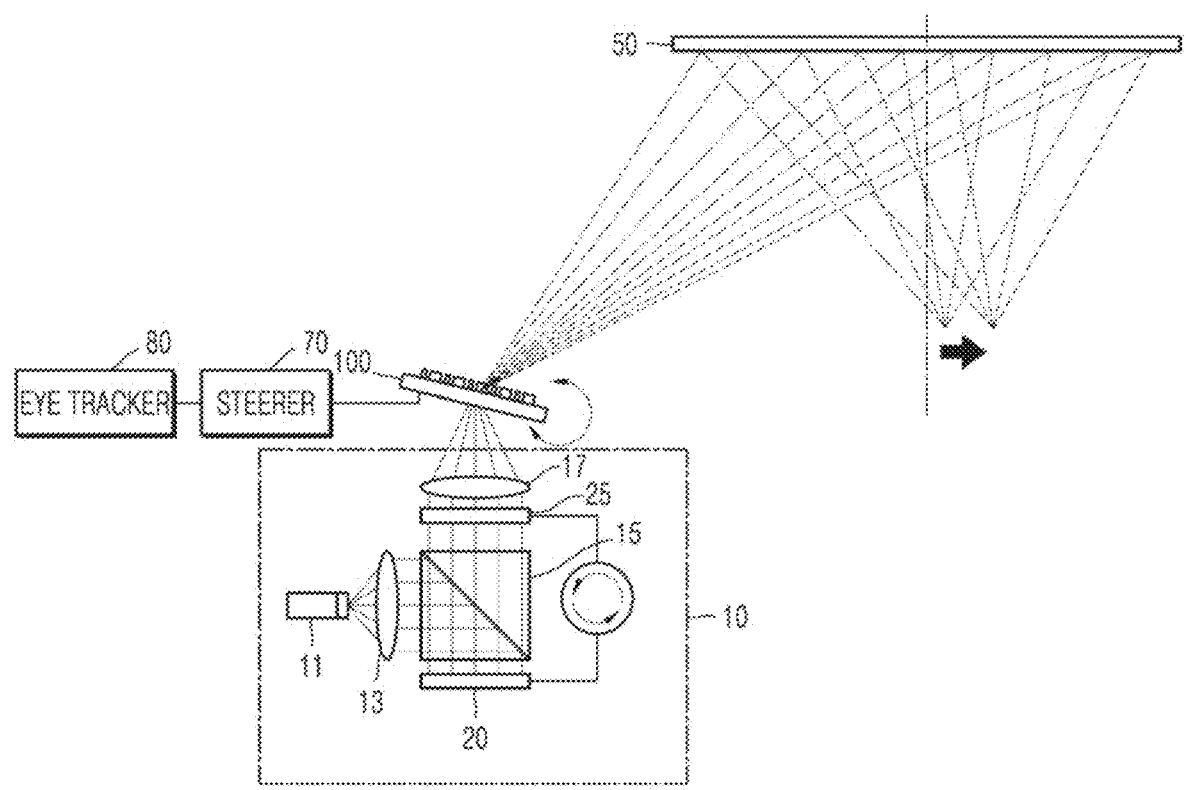

FIGS. 11A and 11B schematically illustrate a configuration of a display device using a meta surface according to another embodiment. Compared with FIG. 9, the display device may further include the steerer 70 and the eye tracker 80. The steerer 70 may drive the meta surface deflector 100 to move a position at which an image is focused.

In FIGS. 10A and 10B and FIGS. 11A and 11B, substantially the same components as in FIGS. 8 and 9 are denoted by the same reference numerals, and repetitive descriptions are omitted.

As shown in FIGS. 10A and 10B and FIGS. 11A and 11B, when the steerer 70 is further provided, the steerer 70 may be controlled to move the position at which the image is focused by the optical element 50 according to a position of an observer's eye sensed by the eye tracker 80.

As shown in FIGS. 10A and 10B and FIGS. 11A and 11B, according to the display device including the steerer 70, an eyebox may further expand.

That is, by providing the meta surface deflector 100, for example, an image of two frames may be imaged on different positions according to a polarization of incident light so that the eyebox may be formed at least twice the size as compared to the case where the meta surface deflector 100 is not applied. In addition, when the steerer 70 that steers the light deflected by the meta surface deflector 100 and incident on the optical element 50, that is, the combiner, is coupled and a steering angle is adjusted to project an image in accordance with a pupil position detected by the eye tracker 80, the image may be provided with respect to a sufficiently large area while the eyebox expanding at least twice the size moves along a view of the observer.

Therefore, by tracking the position of the user's eye through the eye tracker 80, when the position of the user's eye is out of the eyebox area provided by a basic setup, the mirror member 30 or the meta surface deflector 100 may be suitably rotated through the steerer 70. For example, because the hologram element that may be used as the optical element 50 may react to an incident light slightly different from an incidence angle of a reference light used for recording, when a projection angle changes by steering the mirror member 30 or the meta surface deflector 100, the position of the eyebox formed in front of the eyes also may move to a side.

Therefore, by synchronizing eye tracking and steering in real time, a dynamic eyebox may be formed that sufficiently encompasses a movement of the user's eye, and thus the eyebox may expand at least twice the size by applying the meta surface deflector 100. In addition, the eye movement may be more encompassed by steering.

Figure 12:
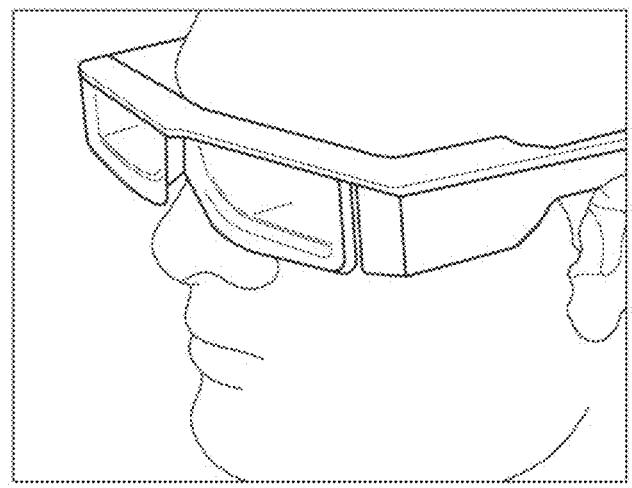
FIG. 12 illustrates an example of implementing a display device according to an embodiment as a glasses-type device.
Figure 13:
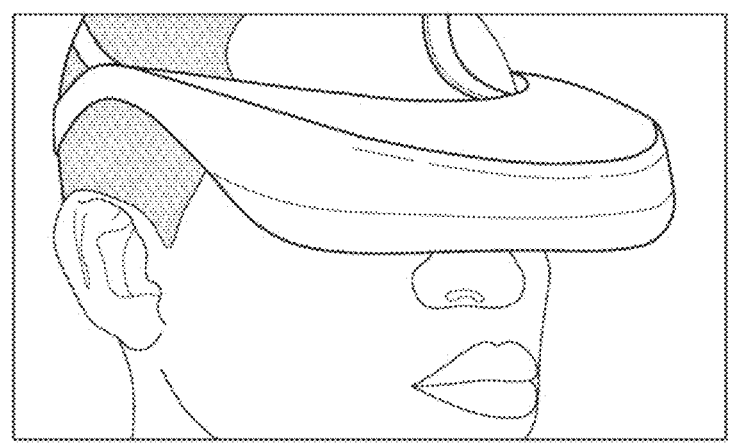
FIG. 13 illustrates an example of implementing a display device according to an embodiment as a goggle-type device.
Figure 14:
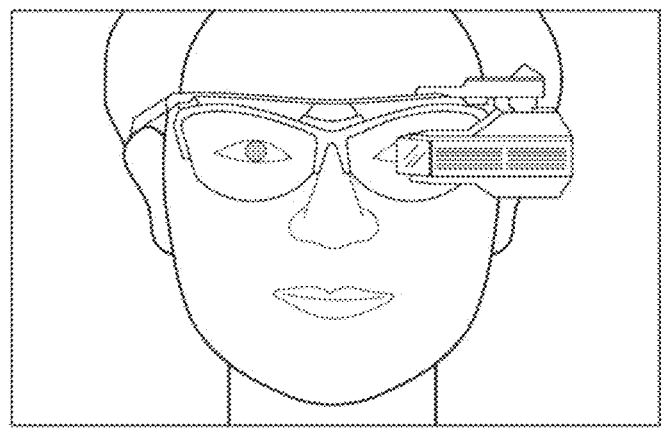
FIG. 14 illustrates an example of implementing a display device according to an embodiment as a head mounted device.

FIGS. 12 to 14 illustrate various electronic devices to which a display device according to various embodiments described above are applicable. As illustrated in FIGS. 12 to 14, the display devices according to various embodiments may constitute a wearable device. In other words, the display device according to an embodiment may be implemented as the wearable device. For example, the display devices of various embodiments may be respectively implemented as glasses-type, goggle-type, and head mounted (HMD) wearable electronic devices as shown in FIGS. 12 to 14. Here, as shown in FIG. 12, when the display device according to an embodiment is implemented as the glasses-type, the optical element 50 may be a glass lens or may be provided on the glass lens.

The wearable electronic devices illustrated in FIGS. 12 to 14 may operate in synchronization with a smart phone or a mobile device.

As described above, the display device of various embodiments may be provided in the smart phone or the mobile device, and the smart phone or the mobile device itself may be used as an AR display device or a VR display device. In other words, the display device of various embodiments may be applied in a small electronic device (a mobile electronic device) rather than the wearable devices as shown in FIGS. 12 to 14. In addition, fields of application of the display device of various embodiments may change in various ways.

Figure 15:
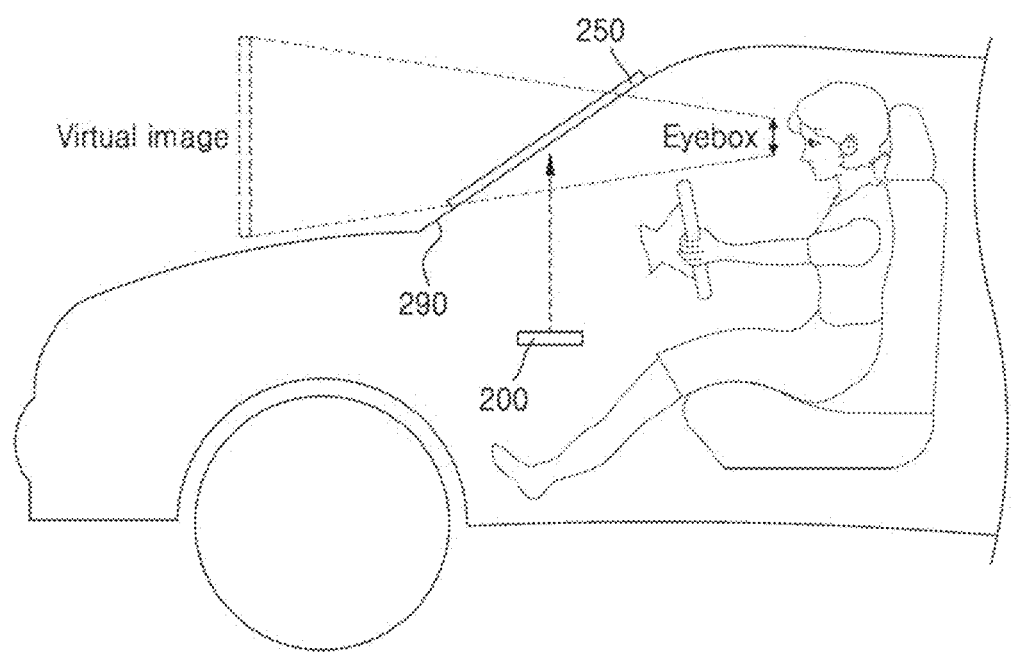
FIG. 15 illustrates a schematic diagram when a display device according to an embodiment is implemented as a head-up display (HUD).

Also, the display device according to various embodiments may be implemented as a HUD as shown in FIG. 15.

FIG. 15 schematically illustrates a schematic diagram when a display device according to various embodiments is implemented as a HUD.

Referring to FIG. 15, an entire unit 200 except for an optical element 250 of the display device according to an embodiment may be mounted at any position in a vehicle, and the optical element 250 as a combiner, for example, a hologram optical element, may be mounted on a windshield 290 of the vehicle and thus implemented as the HUD. In FIG. 15, in consideration that the optical element 250 is mounted on the windshield 290 of the vehicle, a reference numeral of the optical element 250 different from that of the optical element 50 described above is denoted. As described above, the optical element 250 may include a hologram optical element or a diffractive optical element.

In the case of the HUD as shown in FIG. 15, because a driver's head is not fixed, an eyebox of a specific size should exist. By applying the meta surface deflector 100, the eyebox of a sufficient size and a wide viewing angle may be implemented at the same time.

As described above, the display device according to various embodiments may be implemented as an HMD display device, a glasses-type display device, a goggle-type display device, and a HUD AR display device that provide a virtual image and a real landscape and the HMD display device, the glasses-type display device, the goggle-type display device that provide virtual reality.

According to the display device according to an embodiment, an AR display device in which an eyebox expands may be implemented without significantly increasing the overall size of the display device by utilizing a polarization selective characteristic of a meta surface.

According to the display device according to an embodiment, because a meta surface deflector is disposed at an end to which light modulated according to image information from an image provider is incident, a focus may be formed on a different position according to a polarization of incident light. According to the polarization of the light, for example, an image of two frames may be imaged on different positions to form an eyebox at least twice the size as compared to the case where the meta surface deflector 100 is not applied. In addition, a steerer that steers the light deflected by the meta surface deflector is coupled, and a steering angle is adjusted so that an image is projected in accordance with a pupil position detected by an eye tracker, and thus an image may be provided with respect to a sufficiently large area while the eyebox expanding at least twice moves along a view of a user.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising:
    an image provider comprising a spatial light modulator configured to modulate light according to image information, wherein the image provider is configured to provide the light comprising the image information;
    an optical element configured to focus the light from the image provider; and
    a meta surface deflector positioned between the image provider and the optical element, the meta surface deflector comprising an arrangement of anisotropic nanostructures formed on a single surface of the meta surface deflector, the arrangement of the anisotropic nanostructures formed on the single surface of the meta surface deflector configured to deflect the light of a first polarization at a first deflection angle and deflect the light of a second polarization orthogonal to the first polarization at a second deflection angle, so that a deflection direction of the light is changed according to a polarization of the light, wherein a first position of the light of the first polarization focused by the optical element is different than a second position of the light of the second polarization focused by the optical element, and wherein the first deflection angle and the second deflection angle are not parallel with an angle in which the light is incident on the meta surface deflector.

2. The display device of claim 1, wherein the image provider further comprises a polarization rotator configured to convert the polarization of the light directed to the meta surface deflector.

3. The display device of claim 2, wherein the first polarization and the second polarization are linear polarizations or circular polarizations orthogonal to each other, and wherein the polarization rotator is configured to convert the polarization of the light from the first polarization to the second polarization or from the second polarization to the first polarization.

4. The display device of claim 2, wherein the polarization rotator is configured to be driven in synchronization with the spatial light modulator.

5. The display device of claim 1, further comprising a steerer configured to steer the light deflected by the meta surface deflector to move a position at which an image is focused by the optical element.

6. The display device of claim 5, wherein the steerer is configured to drive the meta surface deflector to move the position at which the image is focused.

7. The display device of claim 5, further comprising a mirror member provided between the image provider and the meta surface deflector, wherein the steerer is configured to drive the mirror member to change an angle at which the light is incident on the meta surface deflector, and move the position at which the image is focused.

8. The display device of claim 5, further comprising an eye tracker configured to sense a position of an observer's eye, wherein the steerer is configured to move the position at which the image is focused by the optical element according to the position of the observer's eye sensed by the eye tracker.

9. The display device of claim 1, wherein the optical element is configured to reflect the light from the image provider and transmit external light.

10. The display device of claim 9, wherein the optical element comprises at least one of a hologram optical element and a diffractive optical element.

11. The display device of claim 1, wherein the first polarization and the second polarization are linear polarizations orthogonal to each other, and wherein the meta surface deflector comprises a two-dimensional arrangement of the nanostructures having lengths or widths that are variable in a first direction and a second direction orthogonal to the first direction.

12. The display device of claim 11, wherein the meta surface deflector comprises a plurality of first nanorods having lengths that are variable in the first direction and arranged at a first period to deflect the light of the first polarization, a plurality of second nanorods having lengths variable in the second direction and arranged at a second period to deflect the light of the second polarization, and wherein an array of the plurality of first nanorods and an array of the plurality of second nanorods are alternately arranged to form a two-dimensional array of nanorods, or the plurality of first nanorods and the plurality of second nanorods overlap each other to form a two-dimensional array of cross-shaped nanorod structures.

13. The display device of claim 11, wherein the arrangement of the anisotropic nanostructures comprises:

an arrangement of quadrangular nanostructures or elliptical anisotropic nanostructures in which widths in the first direction and widths in the second direction are variable.

14. The display device of claim 11, wherein the first polarization and the second polarization are circular polarizations orthogonal to each other, and wherein the meta surface deflector comprises a two-dimensional arrangement of nanostructures in which an angle inclined with respect to the first direction is variable.

15. The display device of claim 14, wherein the meta surface deflector comprises:

a plurality of first nanorods having angles inclined with respect to the first direction that are variable in a first rotation direction and arranged at a first period to deflect the light of the first polarization, a plurality of second nanorods having angles inclined with respect to the second direction that are variable in a second rotation direction orthogonal to the first rotation direction and arranged at a second period to deflect the light of the second polarization, and wherein an array of the plurality of first nanorods and an array of the plurality of second nanorods are alternately arranged to form a two-dimensional arrangement of nanorods.

16. The display device of claim 14, wherein the meta surface deflector comprises:

a nanostructure including split ring resonator patterns, and wherein a two-dimensional array of the split ring resonator patterns is arranged such that positions of split portions of the split ring resonator patterns are variable.

17. The display device of claim 1, wherein the display device is a wearable device.

18. The display device of claim 1, wherein the display device is an augmented reality (AR) display device of a head mounted type, glasses type, goggle type, or a head-up type.

19. The display device of claim 18, wherein the display device is of a glasses type, and wherein the optical element is a glass lens or provided on the glass lens.

20. A display device comprising:

a spatial light modulator configured to modulate light to form an image;

an optical element configured to focus the light from the spatial light modulator to permit a user to view the image; and a meta surface deflector provided between the spatial light modulator and the optical element, the meta surface deflector comprising an arrangement of anisotropic nanostructures formed on a single surface of the meta surface deflector, the arrangement of the anisotropic nanostructures formed on the single surface of the meta surface deflector configured to deflect the light of a first polarization in a first deflection direction, and deflect the light of a second polarization in a second direction so that a first position of the light of the first polarization focused by the optical element is different than a second position of the light of the second polarization focused by the optical element, wherein the first deflection direction and the second deflection direction are not parallel with an angle in which the light is incident on the meta surface deflector.

\* \* \* \* \*